United States Patent [19]

Melchior

[11] 4,419,459

[45] Dec. 6, 1983

[54] PROCESS OF PRODUCING TRANSPARENT FOAMED PLASTICS MATERIALS

[75] Inventor: Bernd Melchior, Remscheid, Fed. Rep. of Germany

[73] Assignee: August Hohnholz KG, Hamburg, Fed. Rep. of Germany

[21] Appl. No.: 287,744

[22] PCT Filed: Jan. 14, 1981

[86] PCT No.: PCT/DE81/00012

§ 371 Date: Jul. 30, 1981

§ 102(e) Date: Jul. 30, 1981

[87] PCT Pub. No.: WO81/02018

PCT Pub. Date: Jul. 23, 1981

[30] Foreign Application Priority Data

Jan. 15, 1980 [DE] Fed. Rep. of Germany ....... 3001205

[51] Int. Cl.$^3$ .............................................. C08J 9/22
[52] U.S. Cl. .................... 521/59; 264/45.5; 521/54; 521/134; 521/138; 521/139
[58] Field of Search ................... 521/54, 59, 182, 138, 521/181; 264/45.5

[56] References Cited

U.S. PATENT DOCUMENTS

| | | | |
|---|---|---|---|
| 2,862,834 | 12/1958 | Hiler | 521/54 |
| 2,958,905 | 11/1960 | Newberg et al. | 521/54 |
| 2,959,508 | 11/1960 | Graham et al. | 521/54 |
| 3,023,136 | 2/1962 | Himmelheber et al. | 521/54 |
| 3,256,216 | 6/1966 | Knox | 521/54 |
| 3,271,331 | 9/1966 | Ender | 521/181 |
| 3,277,026 | 10/1966 | Newnham et al. | 521/59 |
| 3,336,184 | 8/1967 | Stastny et al. | 521/54 |
| 3,488,714 | 1/1970 | Walters et al. | 161/161 |
| 3,509,079 | 4/1970 | Hyde et al. | 521/54 |
| 3,616,172 | 10/1971 | Rubens | 521/54 |
| 3,786,004 | 1/1974 | Furuya et al. | 521/138 |
| 4,241,190 | 12/1980 | Lichter et al. | 521/59 |

FOREIGN PATENT DOCUMENTS

| | | |
|---|---|---|
| 1952960 | 10/1966 | Fed. Rep. of Germany . |
| 1494973 | 2/1969 | Fed. Rep. of Germany . |
| 1629381 | 1/1971 | Fed. Rep. of Germany . |
| 915134 | 10/1946 | France . |
| 2133599 | 12/1972 | France . |

OTHER PUBLICATIONS

Diehr et al., Kunststoff, pp. 731–732, 1972.

*Primary Examiner*—Morton Foelak
*Attorney, Agent, or Firm*—Frishauf, Holtz, Goodman & Woodward

[57] ABSTRACT

The present invention relates to processes of producing transparent foamed plastics, particularly foamed acrylate and methacrylate materials, in the form of e.g. panels, molded articles, or as cores for laminate bodies. Solid beads of transparent polymer material and containing a blowing agent are mixed with a reaction resin, softened by heating or swelling, and expanded to large pore size. During the blowing the beads may be displaced relative to one another. Subsequently the reaction resin is completely polymerized. The so obtained foamed plastics panels, which have large closed cells with contiguous faces and a smooth, non-porous surface, are particularly useful as insulating and building material exhibiting good transparency and protection against loss of heat, especially for greenhouses.

10 Claims, No Drawings

PROCESS OF PRODUCING TRANSPARENT FOAMED PLASTICS MATERIALS

FIELD OF INVENTION

The present invention relates to processes of producing transparent foamed plastics materials, particularly foamed polymethacrylates, which may specifically be in the form of sheets, panels, molded articles and laminates having a foamed core.

DESCRIPTION OF PRIOR ART

It is known to make foamed materials from plastics, e.g. from polyurethane. Basically, two processes may be used. In the first process, the starting mixture of monomers and blowing agent is polymerized with simultaneous foaming in a one-shot process. This process will yield useful products only if the monomers polymerize quickly and thus form a mechanically strong product, which may be foamed by the gases or vapours of the blowing agent whereby stable cells are formed.

In the second known process the starting monomer is initially polymerized with the added blowing agent without foaming, whereupon in a second stage the polymer is brought into a plastic or free-flowing condition by the application of heat and at the same time the blowing agent is evaporated or decomposed so that gas bubbles will result within the plastics material and a foamed material will be formed.

None of these known processes will achieve the desired result in the case of polymethacrylates. When the first-mentioned process is used, the bubbles (cells) cannot be kept stable during polymerization of the acrylic foam. As a result of the polymerization the surface tension of the bubles will increase, causing the same to burst and to combine so that the foam will collapse prior to curing.

In the case of polymethacrylate, the known two-stage process also will not lead to the desired result. In accordance with the British Patent Specification No. 1,448,621 and the French Patent Specification No. 1,423,844 a polymethacrylate is to be foamed by initially polymerizing a methacrylate, to which a blowing agent is added, under conditions which prevent the blowing agent from becoming effective. In a second stage the hardened polymethacrylate is then heated to a softening temperature at which the blowing agent will become active. However, as a result of the high internal pressure the foamed material substantially contains only small bubbles. Experiments have shown, moreover, that during foaming the polymethacrylate composition will be blown into every direction so that a foam is obtained which has a wavy and warped surface. Furthermore, this process does not permit production of foamed articles having a continuously smooth and non-porous surface. In addition, the obtained products have little transparency and permit only a diffuse transmission of light, because the light will be reflected by the numerous small bubbles.

There is a demand for a clear, transparent foamed plastics material of high transparency and, at the same time, good mechanical strength, with a high degree of protection against loss of heat and a smooth surface structure. Such a foamed plastics material cannot be made with any of the processes known so far and also differs basically from any known transparent extruded laminate panels of plastics material which have either webs or closely adjacent tubes in their interior.

DESCRIPTION OF THE INVENTION

It is the object of the present invention to provide a process of producing transparent foamed plastics materials, which will result in a foamed plastics having closed, large, plane cells of controlled size, shape and density, a controlled mechanical strength as well as a smooth, non-porous surface; also, the process is to permit the manufacture of molded articles and laminate articles.

The above-specified object is solved by the process according to the present invention of producing a transparent foamed plastics, in which into a reaction resin containing the components required for curing, there are introduced (a) solid beads consisting of a mixture of at least one transparent polymer and blowing agent, and/or (b) solid beads consisting of at least one transparent polymer having microcapsules included therein which contain blowing agent, and in which the beads are expanded and subsequently the reaction resin is cured.

As the reaction resin for this process there may be used particularly a methacrylate, but a polyester, a polyurethane or an epoxy resin may also be used, which contain the respective components required for curing.

The solid beads used in the process of the invention, which consist of a mixture of at least one transparent polymer and blowing agent, may also be present as a granular material and may be made in a manner known per se from a solid material consisting of said transparent polymer and the solid, liquid or gaseous blowing agent included in the material to be activated only upon heating or softening of the material so as to foam the solid beads. In combination with, or instead of, such solid beads it is also possible according to the invention to use solid beads of at least one transparent polymer having included micro-capsules containing blowing agent. The micro-capsules may be prepared in accordance with known mechanical, physical, or chemical methods. For the purposes of the invention, the membrane of the micro-capsule should preferably consist of a transparent polymer. For obtaining the solid beads, the micro-capsules are coated in a manner known per se with a transparent polymer or are polymerized into the same, so that each bead will contain one or a plurality of micro-capsules. In a preferred embodiment of the process the polymer which forms the solid, blowing agent containing beads obtained in one way or another is a polymethacrylate.

Appropriately, the blowing agent used is one that will cause expansion of the solid beads at a temperature which is lower than that required for curing the reaction resin. In this way the cell volume of the foamed plastics will be substantially fully formed before the material hardens in its final shape.

In order to effect expansion of the beads contained in the mixture with the reaction resin, the mixture may be heated whereby decomposition or evaporation of the blowing agent is caused. It is also possible instead, or additionally, to soften the polymer material of the solid beads prior to expansion by heating or partially dissolving in the reaction resin, so that the blowing agent may expand and may inflate the solid bead.

For the manufacture of molded articles the process according to the present invention may be carried out in such a manner that the mixture of reaction resin and blowing agent containing solid beads is introduced into a mold in which subsequently the expansion of the beads and finally curing of the reaction resin are effected. In this way molded articles having a smooth, non-porous surface are obtained.

Panel-shaped, or differently shaped, molded articles including a foamed plastics core which on one side or on either side is bonded to a transparent plastics layer, may be advantageously produced in accordance with the process of the present invention by directly introducing the mixture consisting of reaction resin and blowing agent containing solid beads into a mold which at least on one of its inner sides is provided with, or consists of, a lamination of transparent plastics to be bonded to the foamed plastics core. In order to ensure firm bonding of the finished foamed plastics core to the outer lamination or layer, which layer may be formed either from the same reaction resin as that of the mixture or from another plastics, a coupling agent is added to the mixture of reaction resin and blowing agent containing solid beads, or the inner surfaces of the plastics members to be bonded to the foamed plastics core are provided-prior to introducing the mixture of reaction resin and blowing agent containing beads-with a coating of partially polymerized or gelatinated reaction resin which is then competely polymerized simultaneously with the reaction resin of the mixture. These laminates or layers may also themselves form the non-porous covering layers.

The process according to the invention preferably uses 5 to 50 parts by weight of reaction resin containing the components required for curing, together with 95 to 50 parts by weight of solid beads, consisting of a mixture of at least a transparent polymer and blowing agent, and/or 95 to 50 parts by weight of solid beads of at least a transparent polymer having blowing agent containing micro-capsules included therein, based on 100 parts by weight of the total composition. Preferably, the solid beads have a particle size of about 0.5 to 8 mm.

In each embodiment of the process according to the present invention the amount of blowing agent contained in the solid beads, the diameter of the beads, and the proportions of the mixture with the reaction resin may be selected such that the number, size, shape and density of the bubbles (cells) are accurately controlled and determined, whereby it is possible, among other things, to ensure that the cells having larger surfaces are positioned adjacent one another whereby a foamed plastics of high transparency will be obtained.

Such a foamed plastics having a high transparency is particularly suitable especially for panels coated on either side, which panels are to be substantially opaque but highly transparent.

The mechanical strength of the foamed plastics and of coated foamed plastics panels may be controlled by the amount of reaction resin between the expanded beads.

In accordance with a first advantageous embodiment of the process of the invention polymethacrylate beads are used, which are produced by polymerizing methacrylate containing a blowing agent (e.g. nitrogen, carbon dioxide, methacryl chloride, pentane) in accordance with conventional bead polymerization methods such that the blowing agent is prevented from expanding. Thereby, solid polymethacrylate beads are formed which are unfoamed at room temperature. In accordance with the process of the invention, these beads are admixed with a monomeric methacrylate. By heating and/or patial dissolving in the monomeric methacrylate the beads will become gelatinous. Subsequently the mixture is heated sufficiently for the blowing agent to further expand and to inflate the beads. Depending on the selected amount of blowing agent and the weight ratio of beads to methacrylate and also on the size of the beads, a foam will be obtained which is accurately controlled as to the shape and size of the bubbles. If now the methacrylate present inbetween the beads is polymerized by increased heating, this polymerization will not have any influence on the bubbles (cells) contained within the inflated beads, because these bubbles already prior to the polymerization of the methacrylate are surrounded by polymerized material. When the mixture of beads and monomeric methacrylate was charged into a mold, the bubble size can also be controlled by charge volume of the mold, because the bubbles can expand only until they completely fill the mold.

In the process according to the invention, the solid beads during blowing are in any case enveloped by at least a thin coat of the reaction resin which is not yet polymerized and is therefore free-flowing. Thus, during the blowing operation the solid beads are displaceable relative to one another so as to compensate for internal stresses within the composition, whereby the foamed plastics forms a smooth, plane free surface without any warping which will be retained even after curing of the reaction resin, or whereby, respectively, in case of the expansion taking place in a mold, the internal pressure of the composition is equal everywhere so that even after hardening there will be no stresses in the finished foamed plastics.

To prevent polymerization of the methacrylate before the blowing agent has completed the expanding operation it is important that the temperature stimulating the blowing agent should be below the temperature at which the methacrylate will polymerize. Prior to the expansion of the beads these will become plastic not only by being partially dissolved in methacrylate but additionally, or instead, also by being heated to a temperature below that at which the blowing agent will decompose or will develop vapour pressure causing the expansion.

In accordance with a second advantageous embodiment of the process of the invention a foamed plastics of acrylic glass having a certain size and shape is produced by pouring a mixture of methacrylate and blowing agent containing solid beads either into a mold or between two platens, whereupon the beads are caused to expand by a temperature increase.

Subsequently, the methacrylate is polymerized by a further increase in temperature. In this process it is possible to ensure that the beads during expansion move closely together so that they will adjoin each other with large surface portions and displace most of the methacrylate. Here, too, the formed bubbles will adjoin each other with large surface portions so that a high transparency is obtained.

A layer of a partially polymerized and/or gelatinated acrylic ester may be applied to the inner surface of the mold or, respectively, to one of the two glass or acrylic glass panels. Onto this coating the mixture of blowing agent containing beads and reaction resin is then applied, and the beads are expanded. Then, the resin component of the mixture together with the coating of partially polymerized and/or gelatinated methacrylate is completely polymerized.

A particularly accurate control of the size, shape, density and number of bubbles can be achieved by using solid beads of a transparent polymer, said beads containing microcapsules with blowing agent which preferably are polymerized into the polymer material. These solid beads will then, in the mixture with the reaction resin, be softened by swelling and/or heating, whereby the micro-capsule is caused to burst thus releasing the blowing agent which will expand the bead to form a large cell. Subsequently, the reaction resin is cared by a further increase in temperature.

Preferably, the membrane of the micro-capsule should be made of a transparent polymer material and should, when the bead is swelled or heated, rupture or burst as a result of the pressure of the blowing agent or should expand sufficiently so that the desired bubble size will be obtained.

While it is advantageous for obtaining a high degree of transparency that the bubbles move closely together so that they adjoin each other with large surface portions and thus are caused to have a shape considerably differing from spherical, it is also possible to prepare the mixture in such a way that the bubbles will retain a spherical shape so as to achieve different properties of the panel in a controlled manner.

The solid beads and the reaction resin each may be either colourless or coloured similarly or differently; it is also possible that one of the components is coloured in some way while the other is colourless and opaque, so that the most varied effects, aesthetic appearances and technical effects can be obtained. Moreover, either the mixture or one of the components thereof may contain additional components such a filler materials in order to modify the optical, electrical, chemical, physical and mechanical properties of the foamed plastics.

Furthermore, the process according to the invention may be used with a special advantage for the production of laminated panels in which at least one foamed plastics layer is sandwiched between two, preferably transparent, panels with which it is closely coupled; the foamed plastics layer and the panels may contain similar or different additives so as to modify the optical, physical, chemical and mechanical properties.

The following examples will further illustrate the invention and will disclose modes for carrying out the process.

EXAMPLE 1

A mixture of 50 parts by weight of polymethylmethacrylate (PMMA) beads having a particle size of 3 to 4 mm (composition: 50 parts by weight of PMMA, 10 parts by weight of poly-n-butyl methacrylate, 40 parts by weight of trichlorofluoromethane (Frigen S 11 produced by Farbwerke Hoechst AG) as the blowing agent polymerized into the composition) and of 50 parts by weight of methacrylate reaction resin (composition: 80 parts by weight of methylmethacrylate (MMA), 20 parts by weight of PMMA including 0.3 parts by weight of butyl perbenzoate as an initiating agent) is poured into a mold formed of two glass panes which by means of a round cord are kept at a spacing of 20 mm, to such a level that the filling level in the horizontally disposed mold is about 5 mm. In the course of 30 minutes the blowing agent containing solid beads are partially swelled at room temperature. Then the temperature in the mixture is increased by heating to about 60° to 70° C.

After about 30 minutes the beads have expanded in the mixture sufficiently to completely fill the mold. By further heating at 80° to 90° C. the MMA resin between the foamed beads is completely polymerized in the course of 3 to 4 hours.

The foamed acrylic panel thus formed is cooled for about 2 hours to approx. 30° C. and is then removed from the glass mold.

The foamed acrylic panel which had a thickness of 20 mm, exhibited a smooth non-porous surface and an internal structure of polygonal cells with contiguous faces and having a diameter of about 2 to 5 mm. The panel had good transparency.

EXAMPLE 2

A mixture of 60 parts by weight of PMMA beads having a particle size of 500 to 1000 μm (composition: 40 parts by weight of PMMA, 20 parts by weight of poly-n-butyl methacrylate, 40 parts by weight of trichlorofluoromethane as a blowing agent) and of 40 parts by weight of MMA reaction resin (composition: 90 parts by weight of MMA, 10 parts by weight of PMMA, 0.4 parts by weight of tertiary butyl perbenzoate) is fed into a glass mold formed of two glass panes which by means of round cords are kept at a spacing of 30 mm. The horizontally disposed mold is filled to a filling level of about 6 to 8 mm.

After 60 to 80 minutes the PMMA beads have been partially swelled by the MMA to such an extent that they will expand already when heated to 40° to 50° C. and thus will fill the mold. The reaction resin enveloping the beads is fully polymerized by further heating to 80° to 90° C. for 60 to 90 minutes.

The foamed acrylic panel thus formed is cooled in the mold for 60 minutes from the reaction temperature to 40° C. and is subsequently removed from the glass mold. The polygonal cells of the foamed acrylic panel with contiguous faces have a diameter of about 3 to 8 mm. The panel exhibits good transparency and has a smooth, non-porous surface.

EXAMPLE 3

The mixture used in example 1 is modified such that 10 parts by weight of a di- or trimethacrylate, e.g. 1,4-butanediol methacrylate, are added to the MMA reaction resin as the cross-linking agent. The thus obtained mixture is foamed and cured as in example 1. In the foamed acrylic panel so obtained, the polygonal cells with contiguous faces had a diameter of about 3 to 5 mm. The foamed acrylic panel had a smooth non-porous surface and exhibited good transparency. By the addition of the cross-linking agent the methacrylate reaction resin was cured to form a thermoset resin, which exhibits improved resistance to temperature and chemicals as compared to non-cross-linked polymerized methacrylate material and imparts these properties to the foamed acrylic panel.

EXAMPLE 4

A mixture of 50 parts by weight of PMMA beads having a particle size of 2 to 3 mm (composition: 70 parts by weight of PMMA, 20 parts by weight of poly-n-butyl methacrylate, 10 parts by weight of acetyltributyl citrate) including micro-capsules centrally polymerized into the beads in the conventional manner, said micro-capsules having a size of about 500 μm and containing liquid trichlorofluoromethane as the blowing agent, and of 50 parts by weight of MMA reaction resin (composition: 60 parts by weight of MMA, 40 parts by weight of PMMA, 0.4 parts by weight of tertiary butyl perbenzoate) is fed into a mold made of two glass panes held at a spacing of 30 mm by means of round cords such that the filling level in the horizontally disposed mold is 6 to 8 mm.

The thus charged mold is kept for 1 hour at room temperature. During this time the beads are softened and partially swelled by the MMA. Then the mixture is heated to 60° to 70° C. whereby the internal pressure in the micro-capsule increases such that the blowing agent bursts the membrane of the micro-capsule and expands the softened acrylic bead to form a single cell. After approx. 20 minutes the mold is completely filled.

By further heating at 80° to 90° C. for 2 hours the MMA reaction resin is polymerized completely. Then cooling to 40° C. is effected for 2 hours, and finally the finished foamed acrylic panel is removed from the glass mold.

The foamed acrylic panel, which has a thickness of 30 mm, exhibits good transparency and has a smooth, non-porous surface. The polygonal cells contained therein and having contiguous faces have a diameter of about 8 mm.

The foamed plastics articles produced in accordance with the invention are versatile, particularly as insulating and building material, and may be still better adapted to the respective application by means of additives. Special advantages for the use thereof result from their light weight, their easy workability, their good resistance to temperature and chemicals, to weather and aging, and above all from the good transparency and protection against heat losses, which makes them admirably suited as greenhouse walls. The properties specified above as well as the mechanical strength may be controlled within wide limits by the proper selection of the starting components and by the number, size and kind of the bubbles, which also depend on the way in which the process is conducted.

What is claimed is:

1. A process of producing transparent foamed plastics, comprising mixing (i) a polymerizable composition consisting essentially of methyl methacrylate and a polymerization catalyst and which does not contain a blowing agent, and (ii) at least one component selected from the group consisting of
    (a) solid beads comprising a mixture of at least one transparent polymethylmethacrylate and blowing agent, and
    (b) solid beads comprising at least one transparent polymethylmethacrylate with blowing agent containing micro-capsules enclosed therein,
heating and expanding said beads and polymerizing said polymerizable composition.

2. The process of claim 1, characterized by using a blowing agent which causes expansion of the solid beads at a temperature lower than the temperature required for curing the reaction resin.

3. The process of claim 1, characterized in that prior to expanding the solid beads are softened by heating or by partially dissolving in said polymerizable composition.

4. The process of claim 1, characterized in that the mixture composed of said polymerizable composition and blowing agent containing solid beads is charged into a mold, subsequently the beads are expanded, and then the polymerizable composition is polymerized.

5. The process of claim 4, characterized in that the mixture composed of said polymerizable composition and blowing agent containing solid beads, to which mixture a coupling agent has been added, is fed between two transparent panels forming the mold or part of the same, the beads are subsequently expanded, and said polymerizable composition is polymerized, whereby the foamed plastics is firmly bonded to the panels.

6. The process of claim 4, characterized in that the mixture composed of said polymerizable composition and blowing agent containing solid beads is fed into a mold the inner surfaces of which are coated with a layer of partially polymerized or gelatinated polymerizable composition, the beads are subsequently expanded, and thereupon both said polymerizable composition and the partially polymerized or gelatinated layer are polymerized completely, whereby a foamed plastics having an increased thickness of the smooth, non-porous cover layers and thus an increased mechanical strength is obtained.

7. The process of any one of claims 1 or 5 or 6 characterized in that the blowing agent content of the solid beads, the size of the beads, and their proportion in the mixture with the polymerizable composition are selected such that after expansion of the beads the thus formed cells will adjoin one another with larger surfaces.

8. The process of claim 1, characterized in that 100 parts by weight of the mixture contain
    (1) 5 to 50 parts by weight of said polymerizable composition, and at least one component selected from the group consisting of
    (2) 95 to 50 parts by weight of solid beads, composed of a mixture of at least one transparent polymer and blowing agent, and
    (3) 95 to 50 parts by weight of solid beads composed of at least one transparent polymer having blowing agent containing micro-capsules included therein,
the beads having a particle size of about 0.5 to 8 mm.

9. The process of claim 1, characterized in that 100 parts by weight of the mixture contain
    (1) 5 to 50 parts by weight of said polymerizable composition, and at least one component selected from the group consisting of
    (2) 95 to 50 parts by weight of solid beads, composed of a mixture of at least one transparent polymer and blowing agent, and
    (3) 95 to 50 parts by weight of solid beads composed of at least one transparent polymer having blowing agent containing micro-capsules included therein,
the beads having a particle size of about 0.5 to 8 mm, wherein the blowing agent content of the solid beads, the size of the beads, and their proportion in the mixture with said polymerizable composition are selected such that after expansion of the beads the thus formed cells will adjoin one another with large surfaces.

10. The process of claim 1 wherein said transparent polymer forming the blowing agent containing solid beads consists essentially of polymethacrylate.

* * * * *